United States Patent [19]

Fujiwara et al.

[11] Patent Number: 5,421,768
[45] Date of Patent: Jun. 6, 1995

[54] ABRASIVE CLOTH DRESSER

[75] Inventors: Yukio Fujiwara, Hyougo; Keiichi Shirai, Omiya; Fumio Inoue, Tokyo, all of Japan

[73] Assignee: Mitsubishi Materials Corporation, Tokyo, Japan

[21] Appl. No.: 266,593

[22] Filed: Jun. 28, 1994

[30] Foreign Application Priority Data

Jun. 30, 1993 [JP] Japan .................. 5-162835

[51] Int. Cl.$^6$ .................. B24B 5/00; B24B 29/00
[52] U.S. Cl. .................. 451/283; 451/286; 451/287; 451/285; 451/288
[58] Field of Search ............. 451/283, 285, 286, 287, 451/288, 290, 291, 60, 41, 446, 450, 455, 92, 102, 99

[56] References Cited

U.S. PATENT DOCUMENTS

| | | | |
|---|---|---|---|
| 2,870,580 | 4/1955 | Norton | 451/286 |
| 3,388,504 | 7/1965 | Day | 451/283 |
| 3,813,825 | 6/1974 | Weber et al. | 451/283 |
| 4,532,666 | 8/1985 | Smyth | 15/22 R |
| 4,831,784 | 5/1989 | Takahashi | 451/288 |
| 5,032,203 | 7/1991 | Doy et al. | 451/287 |
| 5,121,572 | 6/1992 | Hilscher | 451/287 |
| 5,191,738 | 3/1993 | Nakazato et al. | 451/288 |
| 5,216,843 | 6/1993 | Breiudgel et al. | 451/446 |
| 5,310,455 | 5/1994 | Pasch et al. | 451/285 |
| 5,329,734 | 7/1994 | Yu | 451/41 |

*Primary Examiner*—Bruce M. Kisliuk
*Assistant Examiner*—Derris H. Banks
*Attorney, Agent, or Firm*—Armstrong, Westerman, Hattori, McLeland & Naughton

[57] ABSTRACT

An abrasive cloth dresser which can efficiently remove reaction products soaked into abrasive cloths for polishing semiconductor wafers etc. without scattering the reaction products. The abrasive cloth dresser includes a rotating hollow arm shaft 7, a high-pressure pure water jetting head 8 provided at a distal end of the hollow arm shaft, and a brush hood 11 provided at a distal end of the high-pressure pure water jetting head 8 and having a brush 16 planted thereto. The high-pressure pure water jetting head 8 includes a jet nozzle 83 through which high-pressure pure water is jetted for impacting reaction products soaked into a piece of abrasive cloth 3 to come out for removal. The brush 16 is elliptical in shape, and has a planted bristle density which is lower in a brush left-hand portion 161 near the high-pressure pure water injection center IC, but higher in a brush central portion 162 and a brush right-hand portion 163. Accordingly, the spent pure water and the reaction products are caused to reside in a pure water pool area WP, following which the pure water having lost energy and the reaction products are discharged through the brush left-hand portion 161 without scattering to the surroundings.

18 Claims, 3 Drawing Sheets

SPRAY PRESSURE

PUSHING PRESSURE

AMOUNT OF SLURRY
(PURE WATER)

ABRASIVE CLOTH DRESSER

BACKGROUND OF INVENTION

A. Field of the Invention

The present invention relates to a lapping apparatus for polishing an object which requires its surface to have a mirror finish and a uniform thickness, such as semiconductor wafers and CD disks, by using abrasive cloths, and more particularly, to an abrasive cloth dresser which is provided in a lapping apparatus to remove slurry-like reaction products of (a) an abrasive soaked into an abrasive cloth and (b) particles scraped off from an object during the polishing with the abrasive cloth by using a high-pressure fluid.

B. Description of the Related Art

The related art will be described in connection with the case of polishing a semiconductor wafer as an object to be polished which requires a mirror finish with a uniform thickness.

Semiconductor wafers produced by cutting single crystal silicon into thin plates require their surfaces to be polished to have a fine mirror finish and a uniform thickness before forming semiconductor circuits.

To this end, a lapping apparatus has been used in which a piece of abrasive cloth, made of felt, is stuck to a rotating base plate (or a platen) and a plurality of heads including a plurality of semiconductor wafers fixed thereto are rotated, causing the abrasive cloth and the semiconductor wafers to rotate relatively in contact relation. In this condition, one side of each of the semiconductor wafers is pressed against the abrasive cloth while an alkaline solution containing abrasive grains, such as fine silica particles, is supplied to the rotating abrasive cloth. As a result, the surfaces of the semiconductor wafers are polished by the process of mechano-chemical polishing so that the wafer surfaces have a mirror finish.

However, after the polishing is repeated many times, the slurry-like reaction products of the abrasive and the particles scraped off from the semiconductor wafers during the polishing are soaked into the abrasive cloth to render it loaded or fouled with the reaction products, resulting in a reduced polishing ability of the abrasive cloth.

Also, because a central area of the abrasive cloth rotates at a lower circumferential speed than an outer peripheral area, the reaction products once soaked into the abrasive cloth are hard to separate out and a larger amount of reaction products tends to soak into the central area of the abrasive cloth. This lowers the pumping action of the abrasive cloth which is caused by intermittent pressing by the semiconductor wafers and restoring forces of the abrasive cloth itself in the direction of thickness. Corresponding to such a lowering in the pumping action, the circulating effect of reaction products is reduced to relatively diminish the amount of abrasive cloth and hence lower the polishing speed. This results in the problem that the polishing surfaces of the semiconductor wafers are tapered, making it impossible to polish the semiconductor wafers into a uniform thickness.

As a method of solving the above problem, it has been attempted to dress the abrasive cloth by stopping the polishing work when loading of the abrasive cloth has reached a certain degree, and rubbing a diamond or ceramic whetstone against the abrasive cloth while a high-pressure pure water is jetted to the same, thereby removing the reaction products from the abrasive cloth.

Such a dressing work is effective to a certain extent in removing the reaction products deposited on the surface layer of the abrasive cloth, the abrasive grains of which polishing effect are reduced, such as fragments of the abrasive cloth chipped off by the dressing, particles scraped off from the whetstone, etc., but the effect is not sufficient to remove the reaction products soaked into an inner layer of the abrasive cloth. As a result, the pumping action cannot restore sufficiently, even after the dressing, to such an extent that semiconductor wafers are surely prevented from tapering in the polishing thereof. In some cases, the surfaces of semiconductor wafers might be damaged by the particles which are not successfully removed from the abrasive cloth, but are separated out to the surface layer.

In order to avoid the above problem, the abrasive cloth must be frequently replaced right before the abrasive cloth has been loaded. This solution, however, raises the problem of increasing the number of abrasive cloths used, and reducing efficiency of the polishing work due to frequent replacement of the abrasive cloths.

As a method of solving the above problem, a lapping apparatus has been proposed which includes a dresser for jetting pure water under high pressure of about 500 kg/cm$^2$, for example, from a jet nozzle to the polishing surface of the abrasive cloth during the polishing work, so that the reaction products residing in the inner layer of the abrasive cloth are caused to come out for removal with impacts of the jetted water (see, e.g., Japanese Patent Laid-Open No. 3-10769 filed by the applicant).

In the proposed abrasive cloth dresser, an anti-scattering cover is provided to surround the whole of a plurality of nozzles for preventing the reaction products removed by the spray of the high-pressure pure water from being sprung out by the jetted high-pressure pure water and scattered to surroundings.

C. Problems to be Solved by the Invention

However, the proposed dresser has been found problematic in that the anti-scattering cover surrounding the plurality of nozzles has a large size, and that partly because of mutual relation among sprays of the high-pressure pure water jetted out of the plurality of nozzles, the pure water and the reaction products remain in the anti-scattering cover so as to coat the surface of the abrasive cloth, and the remained pure water absorbs energy of the high-pressure pure water jetted out of the nozzles, thereby reducing the ability of removing the reaction products from the abrasive cloth.

Further, the reaction products soaked into the abrasive cloth are different in amount depending on locations over the abrasive cloth. From this viewpoint, another problem has been found in that if the reaction products are removed from the entire abrasive cloth under the same conditions, dressing efficiency would not be good and the occurrence of a taper in thickness of semiconductor wafers would not yet be prevented satisfactorily. In particular, such an arrangement that the high-pressure pure water is supplied to the plurality of nozzles through the same supply pipe is not suitable for, e.g., a method of selectively removing the reaction products depending on a fouling degree of the abrasive cloth, which method is believed to be more preferably in consideration of that loading (fouling) of the abrasive cloth depends on locations.

The above-discussed problems are not limited to the polishing of semiconductor wafers, but similar problems are also encountered in polishing the CD surface, the glass surface for liquid crystals, etc.

While the above description is made in connection with the case of using high-pressure pure water to remove the reaction products, the reaction products can also be removed by using an other high-pressure fluid than pure water and, the above-discussed problems are similarly encountered in such a case.

SUMMARY OF THE INVENTION

Accordingly, an object of the present invention is to improve the abrasive cloth dresser of the type proposed in the above-cited Japanese Patent Laid-Open No. 3-10769 filed by the applicant, for example, and to provide an abrasive cloth dresser which has succeeded in solving the problems discussed above.

The present invention is featured by the provision of brush means which fulfills a cover function to prevent a high-pressure fluid, such as high-pressure pure water, sprayed to the surface of abrasive cloth from scattering to the surroundings, and which makes the fluid not reside at the position where the fluid is sprayed to the abrasive cloth, but temporarily reside at a position remote from the spray position, and then allows the residing fluid to be discharged after losing energy.

Thus, according to the present invention, there is provided an abrasive cloth dresser which is provided in a lapping apparatus for rotating a piece of abrasive cloth and an object to be polished relatively in contact relation, and polishing the surface of the object to be polished by using the abrasive cloth and an abrasive supplied to the abrasive cloth, and which is operated to remove reaction products of particles scraped off from the object to be polished during the polishing and the abrasive, the reaction products being soaked into the abrasive cloth, from the abrasive cloth by jetting a high-pressure fluid out of a jet nozzle to be sprayed to the abrasive cloth, wherein:

the dresser includes brush means having a brush which surrounds a position where the high-pressure fluid is sprayed to the abrasive cloth, produces a pool of the fluid jetted from the nozzle, and discharges (expels) the spent fluid and the reaction products from the pool.

Preferably, the jet nozzle is disposed so that the high-pressure fluid jetted from the jet nozzle is inclined by a predetermined angle with respect to a direction normal to the surface of the abrasive cloth.

Also preferably, the brush means is arranged to produce the pool of the high-pressure fluid at a position remote from the spray position in a jetting direction of the high-pressure fluid, and to discharge the fluid from the pool of the fluid.

Further preferably, the shape of the brush as viewed from above facing the abrasive cloth is elliptical or oblong in the longitudinal direction thereof in match with a jet angle of the high-pressure fluid.

The brush means can be arranged to have various forms as follows.

(1) The brush means comprises bristles being substantially uniform in thickness, and the density of the planted bristles is set to be lower in a brush portion near the pool, but higher in other brush portions.

(2) The brush means comprises bristles being planted substantially uniformly in density, and the strength of the bristles is set to be smaller in a brush portion near the pool, bet greater in other brush portions.

(3) The brush means comprises bristles being planted substantially uniformly in density, and the thickness of the bristles is set to be smaller in a brush portion near the pool, but larger in other brush portions.

(4) The brush means comprises bristles being planted substantially uniformly in density, and the brush height is set to be higher in a brush portion near the pool, but lower in other brush portions.

Preferably, the brush is provided on the brush means such that a brush portion preceding in a direction of movement of the brush means is brought into contact with the abrasive cloth so as to nap the abrasive cloth.

In addition, preferably, the brush means is moved slowly in an area where the abrasive cloth is highly loaded (fouled) with the reaction products, but fast in an ares where the abrasive cloth is less loaded (fouled).

The brush means includes a brush which surrounds a position where the high-pressure fluid is sprayed to the abrasive cloth, produces a pool of fluid jetted from the nozzle, and discharges the fluid from the pool. Therefore the sprayed fluid and the reaction products are once enclosed in the brush means, following which the spent fluid and the reaction products are discharged from the brush means under condition of having reduced energy. As a result, the fluid and the reaction products discharged from the brush means are prevented from scattering to surroundings outside the brush means.

With such an arrangement that the jet nozzle is disposed so that the high-pressure fluid jetted from the jet nozzle is inclined by a predetermined angle with respect to a direction normal to the surface of the abrasive cloth, and that the brush means is arranged to produce the pool of the high-pressure fluid at a position remote from the spray position in a jetting direction of the high-pressure fluid, and to discharge the fluid from the pool of the fluid, the spent fluid and the reaction products can be discharged from the brush means in one direction.

Preferably, the brush means is arranged to produce the pool of the high-pressure fluid at the position remote from the spray position in the jetting direction of the high-pressure fluid, and to discharge the fluid from the pool of the fluid.

To this end, the brush means is formed such that bristles have a higher firmness in a brush portion near the fluid pool than in other brush portions remote from the fluid pool.

With such an arrangement that the brush is provided on the brush means such that a brush portion preceding in a direction of movement of the brush means is brought into contact with the abrasive cloth so as to nap the abrasive cloth, the high-pressure fluid serves to make the reaction products floated or exposed from the abrasive cloth, before the reaction products are removed with the high-pressure fluid.

The brush means is moved slowly in an area where the abrasive cloth is highly loaded (fouled) with the reaction products, but fast in an area where the abrasive cloth is less loaded (fouled), enabling the reaction products to be removed optimally depending on a degree by which the reaction products have been soaked into the abrasive cloth.

The above and other (a) objects, (b) advantages, (c) features and (d) aspects of the present invention will be more readily perceived from the following description of the preferred embodiments thereof taken together with the accompanying drawings and claims.

BRIEF DESCRIPTION OF THE DRAWINGS

The present invention is illustrated by way of example and not limitation in the accompanying drawings, in which like references indicate like parts, and in which.

DESCRIPTION OF THE PREFERRED EMBODIMENTS

Figure 1A:
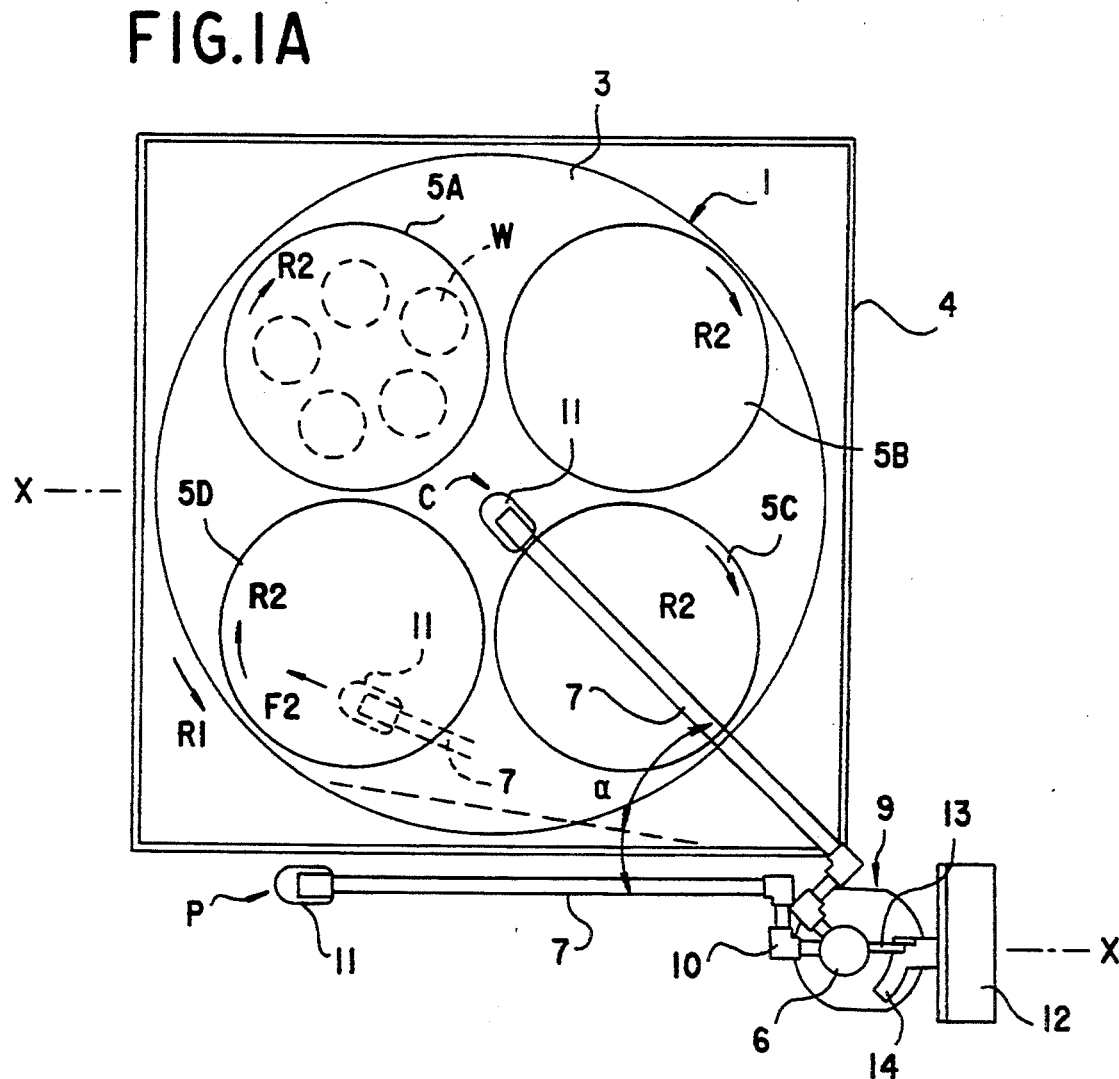
FIG. 1(A) is a plan view as viewed from line H—H in FIG. 1(B) and FIG. 1(B) is a sectional view taken along line X-C-X in FIG. 1(A)
Figure 1B:
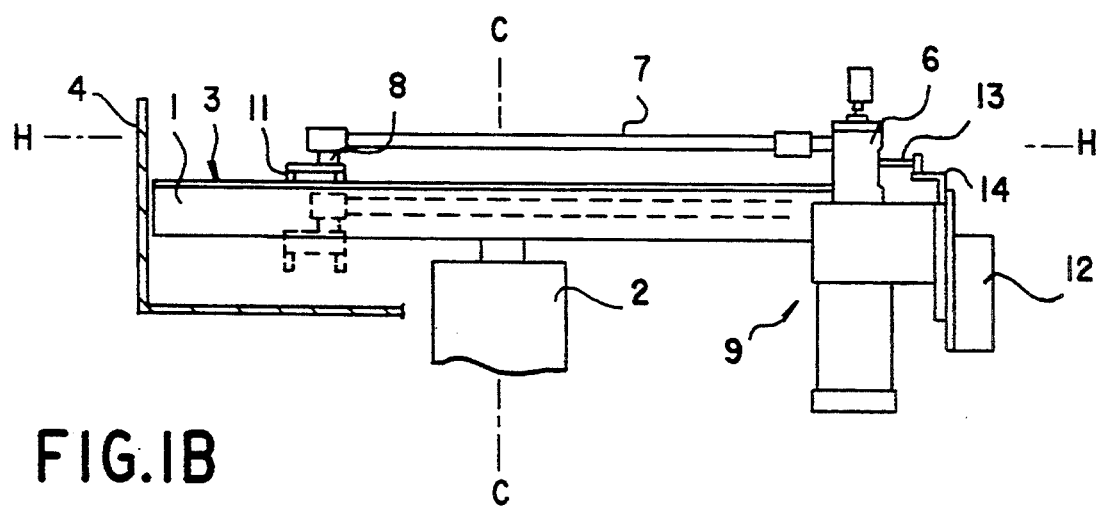

FIG. 1 shows the construction of an abrasive cloth dresser according to a first embodiment of the present invention, which is provided in a lapping apparatus for polishing the surfaces of semiconductor wafers. FIG. 1(A) is a plan view as viewed from line H—H in FIG. 1(B), and FIG. 1(B) is a sectional view taken along line X-C-X in FIG. 1(A).

An illustrated lapping apparatus comprises a lapping platen 1 rotated in a direction R1 by a lapping platen driver 2 which is provided under the platen and has a motor built therein, a piece of abrasive cloth 3 which is made of felt and stuck to the surface of the lapping platen 1, heads (or carrier plates) 5A to 5D to each of which five semiconductor wafers W are fixed as indicated by broken lines, and a receiving pan 4.

The heads 5A to 5D are each rotated by a not-shown driver in a direction R2 opposite to the rotating direction R1 of the lapping platen 1, and also pressed against the abrasive cloth 3 through a not-shown mechanism. The semiconductor wafer W attached to the heads 5A to 5D are thereby brought into pressure contact with the abrasive cloth 3 for polishing the surfaces of the semiconductor wafers W into a mirror finish and a uniform thickness.

During the polishing, an alkaline solution containing abrasive grains such as fine silica particles, for example, is supplied as an abrasive to the abrasive cloth 3 so that the surfaces of the semiconductor wafers W are polished by the process of mechanochemical polishing. As with the prior art, therefore, reaction products of silicon particles scraped off from the semiconductor wafers W under the polishing and the abrasive are generated to deposit on and soak into the abrasive cloth 3.

An abrasive cloth dresser is provided in the above lapping apparatus with an arm shaft 6 and a lever 10, both rotated by an arm driver 9 which is attached to a mount 12, a hollow arm shaft 7 connected to the lever 10, a high-pressure pure water jetting head 8 disposed at a distal end of the hollow arm shaft 7, and a brush hood 11.

The arm shaft 6 is provided with a pin 13. When the abrasive cloth dresser is not operated, the hollow arm shaft 7 is placed in a retracted position P below the lapping platen 1. When the abrasive cloth dresser is operated, the hollow arm shaft 7 is elevated by an air cylinder (not shown) up to a position indicated by solid lines in FIG. 1(B), and is reciprocally rotated by the arm driver 9 within the range determined by the pin 13 abutting against projections at both end of an engagement member 14, i.e., the range between the retracted position P and the center C of rotation of the lapping platen 1. It should be noted that, in actual dressing, the hollow arm shaft 7 is turned within the range between a peripheral edge of the lapping platen 1 and the center C of rotation of the same.

FIG. 2 is an enlarged view of part of the hollow arm shaft 7, the high-pressure pure water jetting head 8, and the brush hood 11.

Figure 2A:
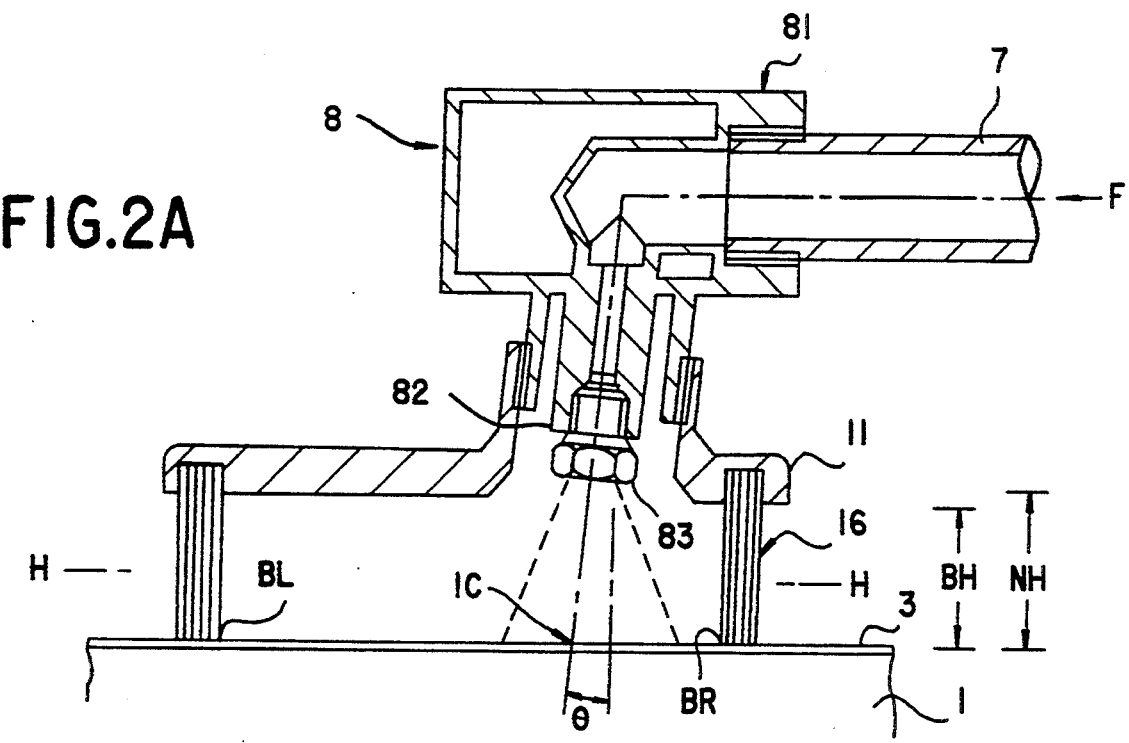
FIG. 2 (A) a sectional view of part of a hollow arm shaft, a high pressure pure water jetting head, and a brush hood.
FIG. 2(B) is a plan view, as viewed from line H—H in FIG. 2(A), of a brush planted in a peripheral edge of the brush hood.
FIG. 2(C) is a graph showing a spray pressure of high-pressure pure water sprayed to abrasive cloth.
FIG. 2(D) is a graph showing a pushing pressure of the high-pressure pure water sprayed to the abrasive cloth.
FIG. 2(E) is a graph showing a flowing behavior of the high-pressure pure water jetted from a jet nozzle provided on the high-pressure pure water jetting head.
Figure 2B:
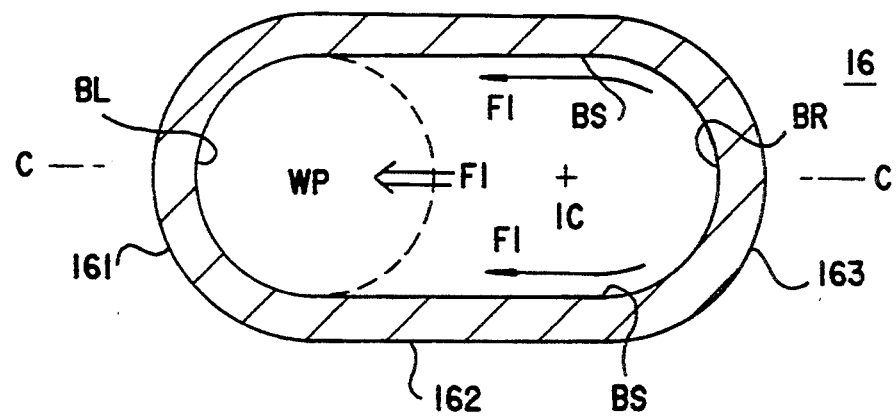
Figure 2C:
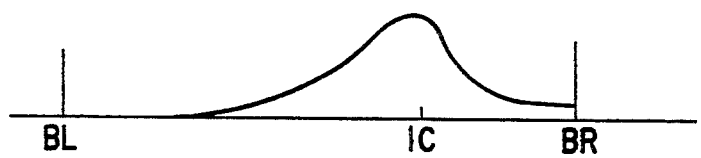
Figure 2D:
Figure 2E:

More specifically, FIG. 2(A) is a sectional view of part of the hollow arm shaft 7, the high-pressure pure water jetting head 8, and the brush hood 11, FIG. 2(B) is a cross-sectional plan view, as viewed from line H—H in FIG. 2(A), of the brush 16 planted in a peripheral edge of the brush hood 11, FIG. 2(C) is a graph showing a spray pressure of high-pressure pure water sprayed to the abrasive cloth 3, and FIG. 2(D) is a graph showing a pushing pressure of the high-pressure pure water sprayed to the abrasive cloth 3, and FIG. 2(E) is a graph showing a flowing behavior of the high-pressure pure water jotted from a jet nozzle 83 provided on the high-pressure pure water jetting head 8.

Male threads are cut around the distal end of the hollow arm shaft 7, and female threads chased in an inner surface of one end 81 of the high-pressure pure water jetting head 8 are screwed to the male threads, whereby the high-pressure pure water jetting head 8 is fixed to the distal end of the hollow arm shaft 7. The jet nozzle 83 is provided in the other end 82 of the high-pressure pure water jetting head 8.

Male threads are cut around the other end 82 of the high-pressure pure water jetting head 8, and female threads of the brush hood 11 are screwed to the male threads, whereby the brush hood 11 is fixed to the other end 82 of the high-pressure pure water jetting head 8.

In other words, the brush 11 is detachably attached to the high-pressure pure water jetting head 8, and the high-pressure pure water jetting head 8 is detachably attached to the hollow arm shaft 7. Accordingly, the type of brush hood 11 including the brush 16 mounted thereto, the type of the high-pressure pure water jetting head 8, etc. can be properly selected depending on the state of the reaction products deposited on the abrasive cloth 3 and other conditions.

The brush 16 is fixed planted to the peripheral edge of the brush hood 11. The brush hood 11 and the brush 16 are elliptical in a plan view. The distal end of the brush 16 is held in contact with the abrasive cloth 3 stuck onto the lapping platen 1. Note that the distal end of the brush 16 is not necessarily held in contact with the abrasive cloth 3, and it may be apart from the abrasive cloth 3 while leaving a predetermined clearance therebetween. From the standpoint of surely preventing a leak of the spent pure water and the reaction products through the brush 16, however, the distal end of the brush 16 is preferably brought into contact with the abrasive cloth 3 to some extent.

The brush hood 11 and the brush 16 jointly constitute brush means.

As illustrated in FIG. 2(B), while the brush 16 is contacting the abrasive cloth 3 in an elliptical shape as viewed from above, the planted bristle density of the brush is lower in a left-hand portion 161 of the brush, e.g. as shown in FIG. 2(B) with reverse hatching lines, and is higher in a central portion 162 and a right-hand portion 163 thereof. In this embodiment, the brush height BH is even.

In FIGS. 1 and 2, a water supply hose (not shown) connected to a water supply mechanism is coupled to a lower end of the arm shaft 6 through a universal joint (not shown) so that water will not leak upon the arm shaft 6 being turned. When the water supply mechanism is operated, high-pressure pure water is jetted from the jet nozzle 83 at the other end of the high-pressure pure water jetting head 8 through the water supply hose and the hollow arm shaft 7 in a flowing direction F in FIG. 2(A) before spraying to the abrasive cloth 3. With this jetted spray of the high-pressure pure water, the reaction products soaked (penetrated) into the abrasive cloth 3 are impacted to come out and to spring out toward the brush 16.

Since the hollow arm shaft 7 is reciprocated through the arm shaft 6 between the retracted position P (in practice, the edge of the lapping platen 1 inwardly of the retracted position P) and the axial center of the lapping platen 1 while the lapping platen 1 is rotating, the reaction products soaked all over the surface of the abrasive cloth 3 stuck to the lapping platen 1 are impacted by the high-pressure pure water jetted from the jet nozzle 83 to come out into the space within the brush 16. The reaction products coming out of the abrasive cloth 3 are discharged from the brush 16 together with the spent pure water following a later-described flowing behavior of the high-pressure pure water.

A description will now be given in detail on removal of the reaction products and a behavior of the high-pressure pure water in the space within the brush 16.

As indicated by broken lines in FIG. 2(A), the high-pressure pure water is divergently sprayed from the jet nozzle 83 to the abrasive cloth 3 with a certain diverging angle. The jet nozzle 83 is inclined by an angle $\theta$ with respect to a direction normal to the abrasive cloth 3. Accordingly, as shown in FIG. 2(C), the spray pressure PI of the high-pressure pure water jetted from the jet nozzle 83 against the abrasive cloth 3 is maximum at the high-pressure pure water injection center IC where the axis of the jet nozzle 83 intersects the abrasive cloth 3, and decays toward peripheries from the injection center IC. Thus, the spray pressure PI of the high-pressure pure water against the abrasive cloth 3 is changed depending on locations in the area of the abrasive cloth 3 surrounded by the brush 16. Since the jet nozzle 83 has a directionality corresponding to its inclination of the angle $\theta$ with respect to a direction normal to the abrasion cloth 3, the spray pressure PI of the high-pressure pure water is higher in the right-hand side than in the left-hand side at positions spaced from the high-pressure pure water injection center IC by the same distance.

The high-pressure pure water jetted from the jet nozzle 83 and sprayed to the abrasive cloth 3 about the high-pressure pure water injection center IC is sprung off the abrasive cloth 3, together with the reaction products having being impacted to come out, toward the jet nozzle 83 in the brush hood 11 and the surrounding brush 16. But, after being reflected by those members, the high-pressure pure water loses energy and becomes spent pure water under low pressure. The spent pure water and the reaction products are enclosed as a slurry in the space defined by the brush 16 and the underlying the abrasive cloth 3. Accordingly, the slurry enclosed in that space will not scatter to the surroundings outside the brush 16.

As the high-pressure pure water is continuously jetted from the jet nozzle 83 toward the abrasive cloth 3, unless the slurry enclosed in the space defined by the brush 16 and the abrasive cloth 3 is discharged from that space, energy of the high-pressure pure water freshly jetted from the jet nozzle 83 would be weakened and the effect of removing the reaction products soaked into the abrasive cloth 3 by the high-pressure pure water would be lowered. For this reason, the slurry enclosed in that space is required to be effectively discharged therefrom.

The high-pressure pure water jetted from the jet nozzle 83 produces not only the spray pressure PI directed from the jet nozzle 83 toward the abrasive cloth 3 as shown in FIG. 2(C), but also a pushing pressure PP directed toward the right-hand inner side BR, both lateral sides BS and the left-hand inner side BL of the brush 16, i.e., applied in directions parallel to the abrasive cloth 3. The pushing pressure PP of the high-pressure pure water taken along line C—C in FIG. 2(B) is shown in FIG. 2(D).

Because of the jet nozzle 83 being inclined toward the left-hand inner side BL of the brush by angle $\theta$ with respect to a direction normal to the abrasive cloth 3, the spent pure water (slurry), including the reaction products, jetted from the jet nozzle 83 and sprayed to and reflected by the abrasive cloth 3 are necessarily forced to flow toward the left-hand inner side BL of the brush in a larger amount than toward the right-hand inner side BR thereof.

Measuring the pushing pressure PP of the high-pressure pure water at positions spaced from the high-pressure pure water injection center IC by the same distance on both the left- and right-hand sides, the pushing pressure PP at the left-hand inner side BL of the brush is higher than that at the right-hand inner side BR thereof.

Also, since the planted bristle density of the brush 16 is lower in the brush left-hand portion 161 than in the brush central portion 162 and the brush right-hand portion 163, the pure water leaking out through the brush left-hand portion 161 is much larger in amount than that leaking out through the brush central portion 162 and the brush right-hand portion 163. In practice, the planted bristle density of the brush 16 is set so that the spent pure water enters between the adjacent bristles in the brush central portion 162 and the brush right-hand portion 163 having the higher planted bristle density, whereby the spent pure water and the reaction products will not substantially leak out through the brush central portion 162 and the brush right-hand portion 163 under the action of surface tension, but most of it then leaks out through the brush left-hand portion 161 having the lower planted bristle density. As a result, the spent pure water, after losing substantial energy by being sprayed to the abrasive cloth 3 about the high-pressure pure water injection center IC and then after losing some energy again by being reflected by the brush central portion 162 and the brush right-hand portion 163, is forced to flow together with the reaction products toward the left-hand inner side BL of the brush in a flowing direction F1 shown in FIG. 2(B). Most of the slurry resides in a pure water pool area WP of the abrasive cloth 3 within the brush 16 and is then pushed out of the brush 16 through the brush left-hand portion 161 with the pushing pressure PP of the high-pressure pure water.

In other words, most of the spent pure water and the reaction products which are sprayed to the abrasive cloth 3 and reflected by the brush central portion 162 and the brush right-hand portion 163, as well as the spent pure water and the reaction products which flow toward the left-hand inner side BL of the brush from the high-pressure pure water injection center IC, reside temporarily in the pure water pool area WP and are then pushed out of the brush 16 through the brush left-hand portion 161. As the spent pure water flowing out of the brush left-hand portion 161 further loses substantial energy upon passing the brush left-hand portion 161, the spent pure water and the reaction products discharged through the brush left-hand portion 161 will not scatter outside the brush.

Additionally, the pure water flowing out of the brush left-handed portion 161 is always discharged along line C—C in FIG. 2(B) in a direction F1 from the brush right-hand portion 163 toward the brush left-hand portion 161.

Referring to FIG. 1(A), the spent pure water and the reaction products discharged through the brush 16 are expelled in the direction F2 of extension of the hollow arm shaft 7, indicated by broken lines, and are then brought into the receiving pan 4 on the left-hand side.

Thus, since the spent pure water and the reaction products discharged through the brush 16 are expelled in opposite relation to the rotating direction R1 of the lapping apparatus 1, they will neither deposit onto the abrasive cloth 3 having been cleaned, nor hence foul (load) the abrasive cloth again. Moveover, the possibility that the abrasive cloth 3 loaded with the reaction products may polish and damage the semiconductor wafers W can also be eliminated.

A first practical example of this embodiment of this invention includes the practical conditions and features listed in Table 1 below.

Table 1

Bristle material: nylon
Bristle thickness (diameter): 0.25 mm
Brush height: 25 mm
Longitudinal length of brush 16: 105 mm
Outer width of brush central portion 162: 52 mm
Inner width of brush central portion 162: 36 mm
Width of brush 16: 7.8 mm
Planted bristle density of the brush left hand portion 161: about one bristle/mm$^2$
Planted bristle density of the brush central and left-hand portions 162, 163: about 12 bristles /mm$^2$
Nozzle height NL from the abrasive cloth 3 to the jet nozzle 83: about 30 mm
Injection pressure range of jet nozzle 83: 30 to 100 kg/cm$^2$ (preferable value is 50 kg/cm$^2$)
Range of inclination angle $\theta$ of jet nozzle 83: 3 to 7 degrees (preferable is value 5 degrees)
Diameter of jet nozzle 83: 1 mm
Diverging angle of high-pressure pure water: 40 degrees (at injection pressure range of jet nozzle 83=30 kg/cm$^2$)
Diameter of semiconductor wafer W: 5 to 6 inches
Pressing pressure of the semiconductor wafer W against the abrasive cloth 3: 0.5 to 0.7 kg/cm$^2$
Rotating speed of lapping platen 1: 500 rpm
Rotating speed of heads 5A to 5D: 0 to 133 rpm
Rotating speed of hollow arm shaft 7: 85 seconds / one direction (constant)
Material of the abrasive cloth 3: felt With the practical example described above, the reaction products soaked into the abrasive cloth 3 can be removed sufficiently, and the surface of each semiconductor wafer W can be finished into a uniform mirror surface. Also, with a construction of this embodiment, the pumping action was evenly developed at all times and the semiconductor wafer W was not tapered by the polishing.

Also, with the above practical example, the life of the abrasive cloth 3 can be prolonged to 150 runs from 60 runs in average, the latter being obtainable with the abrasive cloth dresser proposed in the above-cited Japanese Patent Laid-Open No. 3-10769.

The injection pressure of the high-pressure pure water jetted from the jet nozzle 83 can be adjusted as desired, such as upon a synthetic judgement of the nozzle height NL, the angle $\theta$ of inclination, the felt state of the abrasive cloth 3, the reciprocating speed of the hollow arm shaft 7, and so on. Other conditions are also adjusted depending on the dressing status. Accordingly, the numerical values shown in Table 1 are only listed by way of example.

The shape of the brush 16 in a plan view is not necessarily elliptical as shown in FIG. 2(B), and may be oblong or not so far from elliptical. Alternatively, the brush left-hand portion 161 may be flattened or tapered. However, in order that the spent pure water jetted from the jet nozzle 83 and impinged upon the abrasive cloth 3 and the reaction products having been impacted to come out are allowed to smoothly flow toward the pure water pool area WP, the brush right-hand portion 163 is desirably rounded on its inner side. Thus, the shape of the brush 16 in a plan view is not limited to the above-described one so long as it ensures that the spent pure water jetted from the jet nozzle 83 is smoothly discharged from the pure water pool area WP.

Also, while the case of the jet nozzle 83 being inclined at the angle $\theta$ has been illustrated as a preferred embodiment, the jet nozzle 83 is not necessarily inclined. Even if the jet nozzle 83 has a directionality aligned with the direction normal to the abrasive cloth 3, the spent pure water jetted from the jet nozzle 83, for impacting the abrasive cloth 3 to make the reaction products come out, and the reaction products are caused to flow into the pure water pool area WP substantially along the flowing direction F1, because the high-pressure pure water injection center IC is positioned nearer to the right-hand inner side BL of the brush. By inclining the jet nozzle 83 as illustrated, however, the spent pure water and the reaction products are forced to more easily flow toward the pure water pool area WP following the above-described behavior.

In the foregoing first embodiment, the method for discharging the spent pure water sprayed into the space within the brush 16 about the high-pressure pure water injection center IC on the abrasive cloth 3, together with the reaction products, through the brush left-hand portion 161 after rendering them to reside in the pure water pool are WP, is practiced by arranging the brush 16 so as to have a uniform height and the same material and diameter. But the present invention is not limited to that embodiment, and it can also be practiced in other various arrangements. Several additional arrangements will be described below.

SECOND EMBODIMENT

In this embodiment, the planted bristle density of the brush is set to be uniform, and the strength of the bristles is made weaker in the brush left-hand portion 161 near the pure water pool area WP, but stronger in the brush central portion 162 and the brush right-hand portion 163.

In this case, for example, a bristle material of the brush left-hand portion 161 is selected to be different from that of the brush central portion 162 and the brush right-hand portion 163.

Thus, as with the first embodiment, the second embodiment provides a structure wherein the bristles in the brush central portion 162 and the brush right-hand portion 163 have a greater firmness, enough to substantially prevent the spent pure water and the reaction products (slurry) from discharging therethrough, whereas the brush left-hand portion 161 has a lower firmness which allows the slurry to discharge therethrough.

THIRD EMBODIMENT

In this embodiment, the planted bristle density of the brush is set to be uniform, and the thickness of bristles is made smaller in the brush left-hand portion 161 near the pure water pool area WP, but larger in the brush central portion 162 and the brush right-hand portion 163.

For example, the bristle thickness is set to 0.25 mm in diameter in the brush left-hand portion 161, and to 0.4 mm in diameter in the brush central portion 162 and the brush right-hand portion 163.

As with the first embodiment, the third embodiment also provides a structure wherein the bristles in the brush central portion 162 and the brush right-hand portion 163 have a greater firmness, enough to substantially prevent the spent pure water and the reaction products (slurry) from discharging therethrough, whereas the brush left-hand portion 161 has a lower firmness which allows the slurry to discharge therethrough.

FOURTH EMBODIMENT

In this embodiment, the planted bristle density of the brush is set to be uniform, bristles having the same thickness are used, and the brush height is made higher in the brush left-hand portion 161 near the pure water pool area WP, but lower in the brush central portion 162 and the brush right-hand portion 163.

To form such a construction, the brush hood 11 can be constructed in a sloped relation to the surface of the abrasive cloth 3. In other words, the height of the brush hood 11 in the brush right-hand portion 163 is maintained at the level shown in FIG. 2(A), but the height of the brush hood 11 in the brush left-hand portion 161 is raised from the level shown in FIG. 2(A), so that the brush hood 11 is sloped upwardly to the left.

For example, the brush height is set to 24 mm in the brush right-hand portion 163 and to 36 mm in the brush left-hand portion 161.

As with the first embodiment, the fourth embodiment also provides a structure wherein the bristles in the brush right hand portion 163 have a greater firmness, enough to substantially prevent the spent pure water and the reaction products (slurry) from discharging therethrough, whereas the brush left-hand portion 161 has a lower firmness which allows the slurry to discharge therethrough.

When practicing the present invention, the arrangements of the brush 16 and the brush hood 11 of the first to fourth embodiments can be used in any suitable combination, depending on the circumstances. For example, the brush 16 illustrated as the first embodiment, in which the planted bristle density is set to be lower in the brush left-hand portion 161, but higher in the brush central portion 162 and the brush right-hand portion 163, may be further modified by changing the bristle materials similar to the second embodiment, such that a softer material is used for bristles in the brush left-hand portion 161 and a harder material is used for bristles in the brush central portion 162 and the brush right-hand portion 163.

Further, the brush hood 11 and the brush 16 can have other various arrangements other than those illustrated as the preferred embodiments in order to achieve the above-described structure that the bristles in the brush right-hand portion 163 has a greater firmness, enough to substantially prevent the spent pure water and the reaction products (slurry) from discharging therethrough, whereas the brush left-hand portion 161 has such a lower firmness as allowing the slurry to discharge therethrough.

The material of the brush 16 is not limited to nylon, and any other suitable material may also be used.

FIFTH EMBODIMENT

A fifth embodiment of the present invention will now be described below.

For effectively removing the reaction products soaked into the abrasive cloth 3, it is preferable that the side of the brush central portion 162 which precedes in the rotating direction of the hollow arm shaft 7 is strongly rubbed against the abrasive cloth 3 so as to raise or nap the abrasive cloth 3.

More specifically, in the fifth embodiment of the present invention, before the high-pressure pure water is sprayed from the jet nozzle 83 to the abrasive cloth 3, for impacting the reaction products soaked into the abrasive cloth 3 so as to come out therefrom, the brush central portion 162 on the side preceding the hollow arm shaft 7 in rotation is caused to rub against the abrasive cloth 3 to make the reaction products float somewhat off from the abrasive cloth 3, or to brush or card felt fluffs of the abrasive cloth 3 to make the reaction products exposed. After that, the floated or exposed reaction products are effectively impacted by the high-pressure pure water which is jetted from the jet nozzle 83 so as to come out for removal.

To this end, the contact pressure of the brush 16 against the abrasive cloth 3 applied through the distal end of the hollow arm shaft 7 and the brush hood 11 is increased. Practically, the arm driver 9 drives the hollow arm shaft 7 in a manner not only to be simply turned reciprocally, but also to be turned as to exert a force upon the abrasive cloth 3 from the hollow arm shaft 7. The brush central portion 162 preceding in the rotating direction of the hollow arm shaft 7 undergoes a larger contact resistance than the succeeding brush central portion 162. Therefore, the brush central portion 162 preceding in the rotating direction of the hollow arm shaft 7 can rub against the abrasive cloth 3 to cause the reaction products soaked into the abrasive cloth 3 to be floated or exposed.

The pressing force of the brush 16 against the abrasive cloth 3 through the hollow arm shaft 7 by the arm driver 9 is set to, by way of example, 10 kg.

The fifth embodiment is applicable to all of the various embodiments and forms of the brush 16 explained above.

SIXTH EMBODIMENT

A sixth embodiment of the present invention will now be described below.

With the rotation of the heads 5A to 5D shown in FIG. 1(A), since the rotating speed is higher at peripheral edges of the heads 5A to 5D than at the centers thereof, the reaction products of the particles scraped off from the semiconductor wafers W and the abrasive are generated in a larger amount in the peripheral portions of the heads 5A to 5D, and the abrasive cloth 3 is fouled (loaded) at a higher degree in its areas corresponding to the peripheral portions of the heads 5A to 5D than its areas corresponding to the central portions thereof. If the hollow arm shaft 7 is rotated evenly, the reaction products are removed by the high-pressure pure water jetted from the jet nozzle 83 with a better result in the areas corresponding to the central portions of the heads 5A to 5D. In the case of setting the rotating speed of the hollow arm shaft 7 constant, therefore, the rotating speed is set to be suitable for the areas corresponding to the peripheral portions of the heads 5A to 5D where the abrasive cloth 3 is fouled (loaded) at a higher degree.

With the rotating speed of the hollow arm shaft 7 being so set, however, an excessive time is taken to remove the reaction products soaked into the areas of the abrasive cloth 3 corresponding to the central portions of the heads 5A to 5D where the abrasive cloth 3 is fouled (loaded) at a lower degree. This is not preferable from the viewpoint of dressing efficiency. On the contrary, if the rotating speed of the hollow arm shaft 7 is set to be suitable for the areas where the abrasive cloth 3 is fouled (loaded) at a lower degree, the reaction products would not be removed sufficiently and the polished surfaces of the semiconductor wafers W would be tapered.

In the sixth embodiment, therefore, the arm driver 9 is controlled to turn the hollow arm shaft 7 such that the hollow arm shaft 7 is slowly moved in the areas where the abrasive cloth 3 is highly fouled, but is moved faster in the areas where the abrasive cloth 3 is less fouled. This control may be effected by suitable means as would be apparent to persons in the art in view of the present description.

As a result, it is possible to evenly clean the abrasive cloth 3, to develop the pumping action with a higher evenness, and to complete the dressing in a minimum time without causing a taper in the semiconductor wafers W.

While the abrasive cloth dresser of the present invention has been described above in connection with the situation of polishing semiconductor wafers W, it is needless to say that the abrasive cloth dresser of the present invention is also applicable to cleaning of abrasive cloths used in lapping apparatus for other objects to be polished, e.g., CDs and glass substrates, which require polishing comparable to that for semiconductor wafers.

Also, while a high-pressure pure water is employed in the foregoing embodiments as a high-pressure fluid for removing the reaction products, this is because the semiconductor wafers W are washed by using pure water in polishing of the semiconductor wafers W. Thus, the fluid for removing the reaction products is not necessarily high-pressure pure water, but may simply be a high-pressure water or any other suitable fluid other than water.

According to the present invention, an object to be polished can be finished into a good mirror surface free from any taper with a uniform thickness.

Also, according to the present invention, the life of the abrasive cloth can be considerably prolonged, with the result of a reduction in the cost of such abrasive cloths.

Further, according to the present invention, replacement frequency of abrasive cloths can be reduced, making it possible to shorten a dressing time and hence improve polishing efficiency.

According to the present invention, since reaction products will not be deposited on the cleaned abrasive cloth, the possibility that the removed reaction products may damage the object to be polished can be prevented.

In addition, according to the present invention, since fluids such as the removed reaction products and spent pure water are expelled so as to discharge in one direction and on the abrasive cloth surface to be cleaned subsequently, the discharged reaction products and the spent fluid are more easily handled.

It will be apparent to those skilled in the art that the embodiments described may be varied as discussed above and in other manners, such as to meet particular specialized requirements, without departing from the true spirit and scope of the invention as claimed.

We claim:

1. An abrasive cloth dresser assembly, for a lapping apparatus which rotates a piece of abrasive cloth and an object relative to and in contact relation to one another for polishing the surface of the object along with an abrasive supplied to the abrasive cloth, which removes reaction products of particles scraped off from the object during the polishing and the abrasive, said abrasive cloth dresser, comprising:

a jet nozzle for spraying a high pressure fluid to said abrasive cloth;

brush means having an annular brush which surrounds a position where said high-pressure fluid is sprayed from said jet nozzle to said abrasive cloth, which produces a pool of the fluid jetted from said nozzle, and which discharges the spent fluid and the reaction products from said pool.

2. An abrasive cloth dresser assembly according to claim 1, wherein said jet nozzle is disposed so that the high-pressure fluid jetted from said jet nozzle is inclined by a predetermined angle with respect to the surface of the abrasive cloth.

3. An abrasive cloth dresser assembly according to claim 1, wherein said brush means is arranged to produce the pool of said high-pressure fluid at a position remote from said spray position and in a jetting direction of said high-pressure fluid, and to discharge said fluid from the pool of said fluid.

4. An abrasive cloth dresser assembly according to claim 3, wherein the shape of said annular brush as viewed from above the abrasive cloth is elliptical or oblong in a longitudinal direction thereof extending in a jetting direction of said high-pressure fluid.

5. An abrasive cloth dresser assembly according to claim 4, wherein said brush means comprises bristles which are substantially uniform in thickness, and wherein the density of said bristles is lower in a portion of said annular brush near said pool, but higher in other brush portions.

6. An abrasive cloth dresser assembly according to claim 4, wherein said brush means comprises bristles which are substantially uniform in density, and wherein the strength of said bristles is smaller in a portion of said annular brush near said pool, but greater in other brush portions.

7. An abrasive cloth dresser assembly according to claim 4, wherein said brush means comprises bristles which are substantially uniform in density, and wherein the thickness of said bristles is smaller in a portion of said annular brush near said pool, but larger in other brush portions.

8. An abrasive cloth dresser assembly according to claim 4, wherein said brush means comprises bristles which are substantially uniform in density, and whereas the brush height is higher in a portion of said annular brush near said pool, but lower in other brush portions.

9. An abrasive cloth dresser assembly according to any one of claims 1 to 8, wherein said brush is provided on said brush means such that a portion of said annular brush preceding in a direction of movement of said brush means is brought into contact with said abrasive cloth so as to nap said abrasive cloth.

10. An abrasive cloth dresser assembly according to any one of claims 1 to 8, further including means for moving said brush means slowly in a peripheral area where said abrasive cloth is highly loaded with the reaction products, but faster in a central area where said abrasive cloth is less loaded.

11. An abrasive cloth dresser assembly, for a lapping apparatus for polishing the surface of an object with an abrasive cloth, said abrasive cloth dresser, comprising:
  a jet nozzle for spraying a high pressure fluid to said abrasive cloth;
  a brush hood connected to said jet nozzle;
  an annular brush which surrounds a position where the high-pressure fluid is sprayed from said jet nozzle;
  said annular brush having means for allowing the high-pressure fluid to pass through a portion of said annular brush easier at a first side thereof such that the fluid jetted from said nozzle flows out of the annular brush in a direction from said position towards said portion at said first side.

12. An abrasive cloth dresser assembly according to claim 11, wherein said annular brush is elongated in said direction from said position towards said portion at said first side.

13. An abrasive cloth dresser assembly according to claim 11, wherein said annular brush is elliptical or oblong.

14. An abrasive cloth dresser assembly according to claim 11, wherein said jet nozzle is disposed so that the high-pressure fluid jetted from said jet nozzle is inclined by a predetermined angle with respect to the surface of the abrasive cloth.

15. An abrasive cloth dresser assembly according to claim 11, wherein said annular brush comprises bristles and the density of said bristles is lower in said portion of said annular brush, but higher in other brush portions.

16. An abrasive cloth dresser assembly according to claim 11, wherein said annular brush comprises bristles and the strength of said bristles is smaller in said portion of said annular brush, but greater in other brush portions.

17. An abrasive cloth dresser assembly according to claim 11, wherein said annular brush comprises bristles and the thickness of said bristles is smaller in said portion of said annular brush, but larger in other brush portions.

18. An abrasive cloth dresser assembly according to claim 11, wherein said annular brush comprises bristles and wherein the brush height is higher in said portion of said annular brush, but lower in other brush portions.

* * * * *